United States Patent
Meier

(10) Patent No.: US 10,960,724 B2
(45) Date of Patent: Mar. 30, 2021

(54) COMPRESSED AIR SUPPLY INSTALLATION FOR OPERATING A PNEUMATIC INSTALLATION, METHOD AND VEHICLE

(71) Applicant: WABCO GmbH, Hannover (DE)

(72) Inventor: Joerg Meier, Hessisch Oldendorf (DE)

(73) Assignee: WABCO GMBH, Hannover (DE)

( * ) Notice: Subject to any disclaimer, the term of this patent is extended or adjusted under 35 U.S.C. 154(b) by 0 days.

(21) Appl. No.: 16/771,223

(22) PCT Filed: Sep. 13, 2018

(86) PCT No.: PCT/EP2018/074681
§ 371 (c)(1),
(2) Date: Jun. 10, 2020

(87) PCT Pub. No.: WO2019/115033
PCT Pub. Date: Jun. 20, 2019

(65) Prior Publication Data
US 2021/0001679 A1 Jan. 7, 2021

(30) Foreign Application Priority Data
Dec. 13, 2017 (DE) ...................... 10 2017 011 527.3

(51) Int. Cl.
*B60G 17/052* (2006.01)
(52) U.S. Cl.
CPC ....... *B60G 17/0523* (2013.01); *B60G 17/052* (2013.01); *B60G 2202/152* (2013.01); *B60G 2202/154* (2013.01)

(58) Field of Classification Search
CPC .............. B60G 17/0523; B60G 17/052; B60G 2202/154
See application file for complete search history.

(56) References Cited

U.S. PATENT DOCUMENTS 6,089,831 A 7/2000 Bruehmann
7,441,789 B2 * 10/2008 Geiger ............... B60G 17/0155
280/124.157

(Continued)

FOREIGN PATENT DOCUMENTS

DE 3210030 A1 9/1983
DE 3504884 A1 7/1986
(Continued)

*Primary Examiner* — Faye M Fleming
(74) *Attorney, Agent, or Firm* — Leydig, Voit & Mayer, Ltd.

(57) ABSTRACT

A compressed air supply installation includes a compressed air supply, a compressed air port to a pneumatic installation, a vent port to a venting environment, and a pneumatic main line between the compressed air supply and the compressed air port. The pneumatic main line includes an air dryer. The installation further includes a vent valve arranged in the pneumatic main line, the vent valve being a first pilot valve having a pilot control port, a compressor having at least one compressor stage, and a second pilot valve and a pneumatic pilot control channel that pneumatically connects the second pilot valve to the pilot control port of the first pilot valve. A pressure-holding pneumatic valve device is connected to the pilot control port of the first pilot valve and is configured to provide a control pressure for the pilot control port of the first pilot valve.

10 Claims, 5 Drawing Sheets

(56) References Cited

U.S. PATENT DOCUMENTS

| | | | |
|---|---|---|---|
| 9,273,700 B2* | 3/2016 | Bergemann | F15B 1/02 |
| 10,391,830 B2* | 8/2019 | Bohn | F04B 53/16 |
| 2002/0153688 A1 | 10/2002 | Jurr | |
| 2013/0195682 A1 | 8/2013 | Becher | |
| 2013/0255240 A1 | 10/2013 | Bergemann | |
| 2020/0148022 A1* | 5/2020 | Gehrke | B60G 17/052 |
| 2020/0158104 A1* | 5/2020 | Stabenow | F04B 27/14 |

FOREIGN PATENT DOCUMENTS

| | | | | |
|---|---|---|---|---|
| DE | 3919438 A1 | | 12/1990 | |
| DE | 19515895 A1 | | 10/1996 | |
| DE | 10301119 A1 | | 7/2004 | |
| DE | 10357762 A1 | | 2/2005 | |
| DE | 102012005345 A1 | | 6/2013 | |
| DE | 102012001736 A1 | | 8/2013 | |
| DE | 102012006382 A1 | | 10/2013 | |
| DE | 102012024757 A1 | | 6/2014 | |
| DE | 102017011526 A1 | * | 6/2019 | F15B 21/048 |
| EP | 3219522 A1 | | 9/2017 | |
| WO | WO 01/56820 A1 | | 8/2001 | |

* cited by examiner

COMPRESSED AIR SUPPLY INSTALLATION FOR OPERATING A PNEUMATIC INSTALLATION, METHOD AND VEHICLE

CROSS REFERENCE TO RELATED APPLICATIONS

This application is a U.S. National Phase Application under 35 U.S.C. § 371 of International Application No. PCT/EP2018/074681, filed on Sep. 13, 2018, and claims benefit to German Patent Application No. DE 10 2017 011 527.3, filed on Dec. 13, 2017. The International Application was published in German on Jun. 20, 2019 as WO 2019/115033 A1 under PCT Article 21(2).

FIELD

The invention relates to a compressed air supply installation for operating a pneumatic installation in a pneumatic system of a vehicle, comprising: a compressed air supply; a compressed air port to the pneumatic installation; a vent port to the environment; a pneumatic main line arranged between the compressed air supply and the compressed air port and comprising an air dryer; a vent valve which is arranged on the pneumatic main line and is designed as a pilot valve having a pilot control port, a compressor having at least one compressor stage, in addition to the pneumatic main line, a pilot valve and a pneumatic pilot control channel which pneumatically connects the pilot valve to the pilot control port of the vent valve. The invention also concerns a corresponding vehicle and a method.

BACKGROUND

Compressed air supply installations with pilot-controlled vent valves are generally known. This fundamentally advantageous approach is distinguished in that relatively low forces are required to set the vent valve, and hence the actuation forces of the pilot valve may be lower.

DE 103 01 119 A1 discloses an air suspension system with a valve device having a pneumatically actuatable vent valve which can be pilot-controlled by the compressed air of the air suspension system via an electromagnetically actuatable control valve, and which can connect the air spring and/or the compressed air accumulator to atmosphere.

Such a concept however is worthy of improvement, in particular with regard to the possibility of venting to a lower pressure, in particular venting to practically 0 bar. Such a concept is also worthy of improvement with regard to the venting of initially low pressures.

DE 10 2012 001 736 A1 describes a compressed air supply installation intended to be connected to the control line of a pressure-holding pneumatic device which is configured to hold the pilot control port under control pressure when the vent valve port of the vent valve in the vent line is open, independently of a pressure in the vent line and/or the pneumatic main line.

WO 01/56820 A1 describes an air suspension system for a motor vehicle with a compressor unit, an accumulator unit and switching valves, via which the individual air springs of the individual vehicle wheels can be supplied with compressed air, wherein a vent line which opens to the atmosphere is arranged in the region between the compressor unit and the switching valves and can be blocked or opened by a shut-off valve.

DE 39 19 438 A1 describes a device which can be actuated by pressurized medium and has an air dryer situated between a pressurized medium source and consumers. Due to the composition of the air dryer, moisture is extracted in so-called regeneration mode only with expanded air, i.e. at a pressure which is substantially lower than that of the air discharged on evacuation of the consumers. The air is expanded using a choke point which is active in the line connection from the consumers to the air dryer during evacuation of the consumers. The device allows the control or actuation process, performed on evacuation of the consumer, to take place substantially without influence from the choke point and with increased speed of control or actuation.

Despite advantageous pressure-holding pneumatic devices, such concepts are worthy of further improvement in particular with respect to compactness and simple construction. Such concepts are also worthy of improvement with regard to the venting of initially low pressures. Even with sufficiently high pressures, in particular the latter two concepts require a sufficiently high static pressure upstream of the dryer choke in order to guarantee secure opening of the relay piston. This requires large nominal widths of the upstream pneumatic peripherals.

SUMMARY

In an embodiment, the present invention provides a compressed air supply installation for operating a pneumatic installation in a pneumatic system of a vehicle. The compressed air supply installation includes a compressed air supply, a compressed air port to the pneumatic installation, a vent port to a venting environment, and a pneumatic main line between the compressed air supply and the compressed air port. The pneumatic main line includes an air dryer. The compressed air supply installation further includes a vent valve arranged in the pneumatic main line, the vent valve being a first pilot valve having a pilot control port, a compressor having at least one compressor stage, and a second pilot valve and a pneumatic pilot control channel that pneumatically connects the second pilot valve to the pilot control port of the first pilot valve. A pressure-holding pneumatic valve device is connected to the pilot control port of the first pilot valve and is configured to provide, during venting of the pneumatic system and independently of a pressure in the main pneumatic line, a control pressure for the pilot control port of the first pilot valve. The pressure-holding pneumatic valve device is configured to be pneumatically connected to a pressure accumulator via a feed line. The pressure-holding pneumatic valve device has a selection valve configured for autonomous connection of the pilot control port of the first pilot valve to the feed line in a first operating position and to the pneumatic main line in a second operating position. A line, selected from the feed line and the pneumatic main line, in which a relatively higher pressure prevails is connected to the pilot control port of the first pilot valve, and a line, selected from the feed line and the pneumatic main line, in which a relatively lower pressure prevails is blocked from the pilot control port of the first pilot valve.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
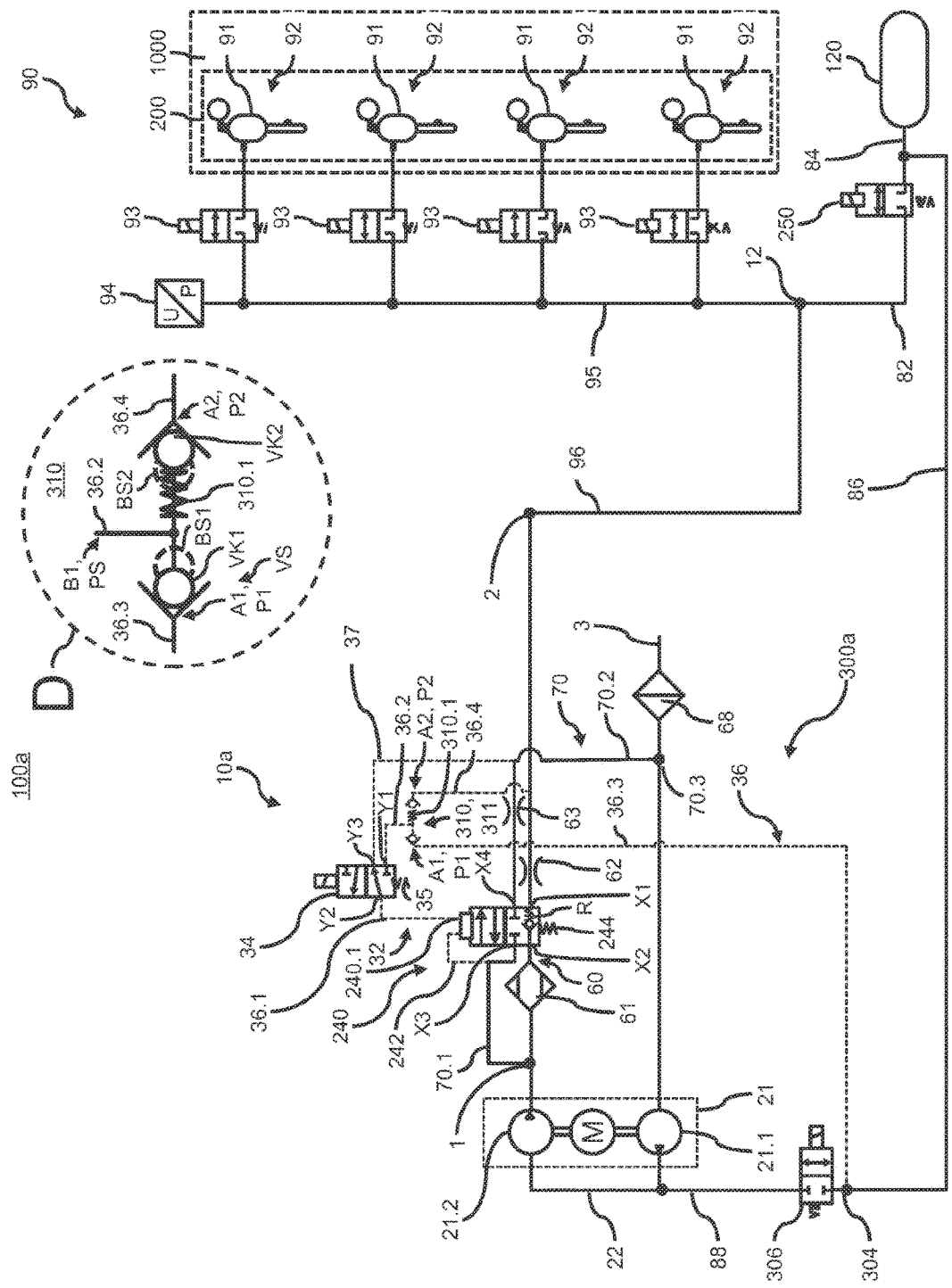
FIG. 1 shows a pneumatic system with a pressure-holding pneumatic valve device with a selection valve, wherein compressed air for loading the pilot control port of the vent valve is conducted via a feed line.

The present disclosure describes an improved compressed air supply installation. In particular with regard to provision of a pressure for actuating a vent valve, the dependency on a pressure in a pneumatic system, in particular a main line, can advantageously be reduced.

The invention provides a compressed air supply installation for operating a pneumatic installation in a pneumatic system of a vehicle, comprising: a compressed air supply; a compressed air port to the pneumatic installation; a vent port to the environment; a pneumatic main line between the compressed air supply and the compressed air port and comprising an air dryer; a vent valve which is arranged on the pneumatic main line and is designed as a pilot valve having a pilot control port, a compressor having at least one compressor stage, in addition to the pneumatic main line, a pilot valve and a pneumatic pilot control channel which pneumatically connects the pilot valve to the pilot control port of the vent valve.

According to the invention, in the compressed air supply installation, it is provided that a pressure-holding pneumatic valve device is connected to the pilot control port and is configured to provided a control pressure for the pilot control port, in particular independently of a pressure in the pneumatic main line during venting of the pneumatic system, and the pressure-holding pneumatic valve device can be pneumatically connected to a pressure accumulator via a feed line; the pressure-holding pneumatic valve device has a selection valve for autonomous connection of the pilot control port to the feed line in a first operating position and to the main line in a second operating position, such that the line in which the relatively higher pressure prevails is connected to the pilot control port and the line in which the relatively lower pressure prevails is blocked from the pilot control port.

A vent valve configured as a pneumatic pilot valve generally has the advantage, e.g. in comparison with a solenoid valve, that it allows switching of large nominal widths of air flows under relatively high pressures, in particular without requiring the high currents required in a solenoid valve.

The invention has recognized that a pressure-holding pneumatic valve device is in principle advantageous since it advantageously reduces a dependency on a pressure in the main line on pilot control of the vent valve. A pressure-holding pneumatic valve device in this way allows venting even at low bellows pressures. Furthermore, it is possible to vent the pneumatic system, in particular the pneumatic installation, to relatively low pressures, in particular to a pressure of practically 0 bar.

A pressure-holding pneumatic valve device allows venting even with initially low pressures which may e.g. be present in the rear axle springs.

The invention has found that it is advantageous, in particular for the reliability and function range of a pilot-controlled vent valve, to provide more than one compressed air source for actuating the vent valve, in order, in particular, to advantageously reduce the dependency on just a single compressed air source. Such a reduced dependency allows for example the provision of an adequate quantity of sufficiently compressed air for pilot control of the vent valve, in particular via a pressure accumulator, even with almost or completely evacuated spring bellows and hence a pressure in the main line which is insufficient for actuation. Here in particular it is advantageous if the pressure source is already connected to the pilot control port and contains pressure, in particular pressure sufficient to actuate the vent valve. In particular, it is advantageous if the selection of pressure source is made autonomously, in particular automatically and/or in controlled and/or regulated fashion. In particular, it is thereby advantageously ensured that sufficient pressure or at least the higher pressure is always available to actuate the vent valve. The possibility of selecting a suitable pressure source, in particular having a higher pressure, and in particular selecting a pressure accumulator as a pressure source for actuating the vent valve, advantageously allows provision of a regeneration choke with a relatively large diameter arranged in the vent line, in order to allow venting which is as rapid as possible while taking into account as effective as possible a regeneration of the air dryer on the principle of pressure change adsorption. Effective venting is achieved in particular if the compressed air used for pilot control is now taken from the pressure-holding pneumatic device, in particular a pilot pressure accumulator. Because the control pressure for the vent valve is provided by the pressure-holding pneumatic valve device, the dryer choke need no longer be designed for sufficient static pressure. Thus advantageously in the choke design, in particular only the regeneration quality and lowering speed need be considered. This furthermore leads to the advantage that if the peripherals upstream of the dryer choke are designed with relatively small flow diameters—and accordingly no static pressure can be created upstream of the dryer choke when the drainage path is open—the relay valve can still be opened safely and completely.

In the context of the invention, the terms "selection valve" and "changeover valve" are not restricted to a single physical valve, and may also be understood as a "selection valve arrangement" and "changeover valve arrangement". A selection valve may for example be formed with two separate check valves, one of which has an additional spring.

Advantageously, it is provided that the feed line can be pneumatically connected to the compressor for charging the compressor. In concrete terms, this may mean that a feed line, which is present and used in particular primarily for charging a compressor, is also used to conduct compressed air to the pilot control port of the vent valve. Here it is already advantageous if just part of the section between the pressure accumulator and the vent valve is covered by the feed line. At a suitable point, for example upstream of a charging valve, a control line may branch off which pneumatically connects the feed line to the pilot control port of the vent valve. This is particularly advantageous if such a feed line is already present, in particular between the pressure accumulator and compressor (or another component arranged in the vicinity of the vent valve). Such a feed line may be used for example for charging a compressor, in a so-called boost function. In this case, the existing air line may also be used partially or fully for the pressure-holding pneumatic valve device. Pilot control of a vent valve by means of an existing line, in particular an existing feed line or charging line, is advantageous because in this way no additional line is required for pilot control and hence installation space and components may be saved. The use of existing lines keeps the complexity of the installation relatively simple.

Advantageously, it is provided that the selection valve arrangement is configured as a changeover valve. In concrete terms, this means that the charging valve has two inputs and one output, wherein the two inputs each have a valve body which, in the sense of a check valve, allows air to flow into the valve but conversely does not allow air to flow out of the valve in the opposite direction. This arrangement means that the input at which the higher pressure is present is opened by the inflowing air, and at the same time this inflowing air presses the valve body of the other input, at which a lower pressure prevails, into the blocking position. In this way, the inflowing air under higher pressure can pass the changeover valve to the output, and the input at which the lower pressure is present is blocked. Thus, in particular for loading the pilot control port of the vent valve, the port at which the higher pressure prevails is selected automatically. If the pressures are even, i.e. equally high pressures prevail at the first input and second input of the selection valve, in particular both inputs are opened. The check valve property of the two inputs of the selection valve ensures that once compressed air has passed through an input, it cannot flow back through either of the two inputs and hence is held at the output of the selection valve. By holding the compressed air at the output and in particular in the second part of the control line between the output of the selection valve and the closed first pilot valve port, in particular advantageously a storage effect is achieved for the second part of the control line. The check valve property of the two inputs of the selection valve ensures that the respective highest air pressure present at one of the two inputs is held in the second part of the control line until the pilot valve is opened in order to actuate the vent valve.

Advantageously, it is provided that the selection valve has an in particular adjustable preferred position such that, with equal pressures at the first input and the second input of the selection valve, the input at the preferred position is connected to the output of the selection valve, and in particular the other input is blocked. This means in particular that a preferred input of the selection valve is opened, and in particular the other non-preferred input is blocked, although the pressure prevailing at the non-preferred input is the same or even greater. Such a preferred setting allows one pressure source to be preferentially connected to the pilot control port of the vent valve, i.e. in particular when the pressures are lower than in the other pressure source.

In particular, it is provided that the selection valve has a spring for predefining a preferred position. A spring in particular advantageously allows a setting of a spring force for defined loading of a valve body. A defined spring force allows the setting of a relative pressure difference between the first input (A1) and the second input (A2), above which the one preferred input closes and the non-preferred input opens. Such a pressure difference also describes the amount by which the opening behaviour of the selection valve is shifted, because of the preferred position, from a normal opening behaviour, i.e. opening of both inputs when the pressures are equal.

In the context of a preferred refinement, it is provided that the compressor has a first low-pressure compressor stage and a second high-pressure compressor stage. In concrete terms, this means that a low-pressure stage and a high-pressure stage of the compressor compress the air successively to different pressure levels. In this way, the motor power may be used optimally to achieve a predefined pressure level.

In particular, it is provided that the feed line can be pneumatically connected via a charging line to the compressor, in particular to the input of the high-pressure compressor stage, for charging the compressor. In particular, via an intermediate line which pneumatically connects the low-pressure stage and the high-pressure stage, additional air, in particular pre-compressed air stored in a pressure accumulator, can be conducted to the input of the high-pressure stage for charging. This function, known as the boost function, allows an at least brief increase in the compression power of the compressor.

Advantageously, it is provided that a pressure-holding pneumatic valve device is integrated completely or partially in the compressed air supply installation, in particular forms a structural unit therewith. In concrete terms, this means that the pressure-holding pneumatic valve device is integrated in the compressed air supply, substantially forming one structural unit. The compressed air supply may be formed as a closed structural unit or as a modular system composed of modules which are joined together to form a compressed air supply, and wherein the pressure-holding pneumatic valve device forms one module or part of a module. In particular, the compressed air supply installation may comprise, in addition to the pressure-holding pneumatic valve device, the compressor arrangement, the pneumatic main line, the vent valve, the air dryer and the vent line.

By integrating the pressure-holding pneumatic valve device, advantages may be achieved in particular with respect to reducing the installation space required, weight saving and cost efficiency of components.

The invention further provides a method for operating a compressed air supply installation, wherein the compressed air supply installation is used to operate a pneumatic installation in a pneumatic system of a motor vehicle, and has a pressure-holding pneumatic valve device, comprising the steps: compressing the compressed air; supplying the pneumatic system, in particular the pneumatic installation and/or a pressure accumulator and/or a gallery with compressed air; operating the pneumatic installation; venting the pneumatic system via a vent valve configured as a pilot valve and having a pilot control port; wherein a pressure-holding pneumatic valve device connected to the pilot control port holds the pilot control port under control pressure, in particular independently of a pressure in the pneumatic main line, during venting of the pneumatic system; the pressure-holding pneumatic valve device can be pneumatically connected to a pressure accumulator via a feed line; the pressure-holding pneumatic valve device has a selection valve for autonomous connection of the pilot control port to the feed line or the main line such that the line in which the relatively higher pressure prevails is connected to the pilot control port, and in particular the line in which the relatively lower pressure prevails is blocked from the pilot control port.

The method according to the invention for operating a compressed air supply installation advantageously utilizes the advantages of the compressed air supply installation. In particular, venting by means of a vent valve configured as a pilot valve advantageously allows venting to be performed independently of a pressure in the main line, since the pilot control of the vent valve takes place with separately stored compressed air. Thus venting may take place for example independently of a pressure prevailing in the air springs of the pneumatic installation.

The invention also provides a vehicle with a compressed air supply installation. The concept of the invention is advantageously utilized in the vehicle; in particular, a pressure-holding pneumatic valve device according to the concept of the invention allows, as well as the above-mentioned advantages, a faster possible lowering speed of the air springs.

FIG. 1 shows a preferred embodiment of a pneumatic system 100a with a compressed air supply installation 10a and an air suspension installation 90 for a vehicle suspension (shown symbolically) of a vehicle 1000 (not shown in detail). The compressed air supply installation 10a has a compressed air supply 1, a compressed air port 2 to the air suspension installation 90, and a vent port 3 to the environment. The compressed air supply installation 10a furthermore comprises a pneumatic main line 60 between the compressed air supply 1 and the compressed air port 2.

These and the fundamental elements described below for constructing the pneumatic system with the compressed air supply installation 10a and the pneumatic installation 90 also apply to the variants of a pneumatic system 100a, 100b, 100c shown in FIGS. 1 to 3 with corresponding air supply installation 10a, 10b, 10c. In the description below, for the sake of simplicity, the same reference signs are used for identical or similar features or parts of identical or similar function where suitable and appropriate; however, it must be understood that different variants of components and elements may be used for the pneumatic systems 100a to 100c and the compressed air supply installations 10a to 10c.

The pneumatic main line 60 has an air dryer 61 and a first choke 62. A vent line 70 of the compressed air supply installation 10a connects the compressed air supply 1 to the vent port 3 via a vent valve 240 and a second choke 63. A first part 70.1 of the vent line 70 connects the compressed air supply 1 to the vent valve 240. A second part 70.2 of the vent line 70 also connects the vent valve 240 to a connection point 70.3. The connection point 70.3 is in turn connected amongst others to the vent port 3 via an air filter 68. A main gallery port 12 of the air suspension system 90 is connected to the compressed air port 2 via a supply line 96.

Furthermore, a pilot control port 240.1 of the vent valve 240 can be selectively pressurized by means of a pilot valve 34, so that the vent valve 240 can be opened and closed pneumatically.

In the present case, the vent valve 240 is preferably designed as a 4/2-way directional valve. In the depiction shown here, the vent valve 240 is shown in a first delivery position. In this delivery position of the vent valve 240, compressed air can flow from a second pneumatic port X2 to a first pneumatic port X1, through a check valve R which opens against the spring force. Thus the compressed air delivered by the compressor 21 flows through the pneumatic main line 60 from the compressed air supply 1 to the compressed air port 2 and on to the pneumatic installation 90. The pneumatic connection between a third pneumatic port X3 and a fourth pneumatic port X4 is interrupted in the delivery position of the vent valve 240, which means that the vent line 70 is interrupted.

The vent valve 240 may in particular be brought from the blocked position shown into a vent position by pneumatic actuation, in particular via a pilot control port 240.1. In this vent position, firstly air can flow from the compressed air vent port 2 and also from the first pneumatic port X1 to the second pneumatic port X2 through the air dryer 61. Via the compressed air supply 1, the air can then flow further from the compressed air supply 1 and also from the third pneumatic port X3 to the fourth pneumatic port X4 via the vent line 70 to the vent port 3. In this way, for the purpose of regeneration by means of compressed air, air from a pressure accumulator 120 or a pneumatic installation 90 can flow through the air dryer 61 against the usual delivery direction.

The right-hand side of FIG. 1 clearly shows a pneumatic installation 90 in the form of an air suspension system of a vehicle. The air suspension system 90 has a gallery 95 to which a respective spring bellows 91 of an air spring 92 is connected, wherein the connection may be pneumatically interrupted by a respective directional control valve 93 configured as a 2/2-way magnetic valve. A pressure sensor 94 is connected to the gallery 95.

The pressure sensor 94 is here connected to a device 400 (not shown in detail) for control and regulation of the pneumatic system 100, said device furthermore being connected for signal conduction to the valves of the pneumatic system 100, in particular the directional control valves 93, the pilot valve 34, a pressure storage valve 250, a charging valve 306 and/or a pilot switching valve 307. These connections are not shown in the present case for reasons of clarity. Such a device may be formed for example by an electronic control unit (ECU).

Furthermore, the compressed air supply system 10 in the present case comprises a pressure accumulator 120. The pressure accumulator 120 is connected gas-conductively to the main gallery port 12 via a pressure accumulator supply line 82. This connection can be selectively interrupted via the pressure storage valve 250.

The compressor arrangement 21 is in the present case driven by a motor M and for compression draws in air via the vent port 3. An air filter 68 is arranged between the compression arrangement 21 and the vent port 3. In the present case, the compressor 21 has a low-pressure stage 21.1 and a high-pressure stage 21.2 which are connected together pneumatically via an intermediate line 22, such that the compressed air drawn in by the vent port 3 and precompressed in the low-pressure stage 21.1 can flow into the high-pressure stage 21.2 where it is compressed further to a high-pressure level, in order then to be supplied to the compressed air supply 1.

Also, a second pilot control port 242 is provided on the vent valve 240, such that the vent valve 240 can be actuated by extraction of the pressure at the pneumatic main line 60.

In the present case, the pneumatic installation 90 has five level control valves which are formed as bellows valves in the form of a directional control valve 93, and as a pressure storage valve 250, in the form of a magnetic directional control valve, namely a 2/2-way magnetic directional control valve. The bellows or pressure storage valves 93, 250 formed as magnetic directional control valves are connected together via a gallery 95, wherein the gallery 95 is connected to the pneumatic main line 60 via a further supply line 96 at the compressed air port 2.

To operate the pneumatic installation 90, depending on the height level measured, the bellows 91 forming the air springs are filled with compressed air from the compressed air supply installation 10a via the compressed air port 2; this serves to raise the level of the superstructure of the vehicle 1000. Conversely, the air bellows 91 can be vented in the opposite direction via the compressed air port 2 leading to a vent port 3, so that the level of the vehicle superstructure 200 is lowered as compressed air escapes from the spring bellows 91. To fill the pneumatic installation 90 via the compressed air port 2, the vent valve 240 is in the delivery position shown, i.e. closed and unpowered or not pressurized. Similarly, the third and fourth pneumatic ports X3, X4 are pneumatically isolated, i.e. the first part 70.1 of the vent line 70 is closed against the second part 70.2 of the vent line 70.

To vent the pneumatic installation 90, the magnetic coil of the pilot valve 34 is suitably energized by means of a current signal conducted via a line (not shown here); consequently, the magnetic coil of the pilot valve 34 is energized and opened against the spring pressure of a control valve spring 35. The control line 36 is thus opened via the pilot valve 34, i.e. the first part 36.1 of the control line 36 is connected to the second part 36.2 of the control line 36 and to the pilot control port 240.1. A control pressure PS present in the control line 36 is built up at the pilot control port 240.1, and acts against the force of the vent valve spring 244 of the vent valve 240; finally, the third pneumatic port X3 opens to the fourth pneumatic port X4 of the vent valve 242, and hence the vent line 70 and an output of the air dryer 61 to the vent port 3. The first pneumatic port X1 is simultaneously connected to the second pneumatic port X2, so that the blocking effect of the check valve R in the vent valve 240 is eliminated. With the valve ports X3, X4 of the vent valve 240 in the vent line 70 opened in this way, in the present case the pilot control port 240.1 is held under control pressure PS.

This arrangement of pilot valve 34 with control line 36 to the pilot control port 240.1 of the vent valve 240, selection valve 310 and vent valve 240, is designated below also as the pressure-holding pneumatic valve device 300a or, as in the further figures, as the pressure-holding pneumatic valve device 300a, 300b, 300c; the pilot control port 240.1 is held under control pressure PS by the pressure-holding pneumatic valve device 300a, 300b, 300c, in particular also when the air pressure is falling during the vent process in the main line 60.

In addition, according to the concept of the present invention, in the further embodiments explained it is provided that, with the pneumatic ports X3, X4 of the vent valve 240 in the vent line 70 open, the pilot control port 240.1 is held under control pressure PS; this is independent of a pressure in the vent line 70 and the pneumatic main line 60. In particular, by means of a pressure-holding pneumatic valve device 300a, 300b, 300c, the control pressure PS can be maintained, in particular although a pressure in the vent line 70 and/or in the pneumatic main line 60 may fall below a residual holding pressure, i.e. a pressure predefined by the vent valve spring 244 for actuation of the vent valve 240. Thus according to all embodiments explained below, it is guaranteed that the pressure in the vent line 70 and the pneumatic main line 60 can fall practically to ambient pressure, so that the spring bellows 91 can be vented down to ambient pressure.

With reference to FIG. 1, for venting, the coil of the pilot valve 34 configured as a 3/2-way valve is energized and the pilot valve 34 transfers from the unpowered state shown in FIG. 1 into the powered state in which the first pilot valve port Y1 is connected pneumatically to the second pilot valve port Y2; i.e. the first part 36.1 of the control line and the second part 36.2 of the control line 36 to the pilot control port 240.1 are connected together.

A third part 36.3 of the control line 36 adjoining the second part 36.2 also connects the first pilot valve port Y1 to a branch point 304 at which the control line 36 is pneumatically connected to a feed line 86. The feed line 86 is in turn pneumatically connected to the compressed air accumulator 120 via an accumulator line 84.

The function of the pressure-holding pneumatic valve device 300a is explained in more detail below. To actuate the vent valve 240, the pilot valve 34 configured as a 3/2-way valve is switched into an actuation position in order to open the pilot valve 34 in the control line 36. In this actuation position, compressed air which is present at the first pilot valve port Y1 can flow from the pressure accumulator 120, via the accumulator line 84, the feed line 86 and the control line 36, through the pilot valve port Y2 and the first part 36.1 of the control line 36, to the pilot control port 240.1 of the vent valve 240. In this way, the compressed air stored in the pressure accumulator 120 may be used to load the pilot control port 240.1 and hence actuate the vent valve 240, in particular independently of the pressure prevailing in the pneumatic main line 60.

The feed line 86 is furthermore connected via the branch point 304 to a charging line 88 which is pneumatically connected to the intermediate line 22, and via which the compressor 21 can be charged with compressed air from the pressure accumulator 120. The charging line 88 can be selectively connected to or isolated from the feed line 86 via a charging valve 306. In this way, compressed air, which in particular has been compressed at an earlier time and stored in the pressure accumulator 120, can be conducted, as already precompressed air, via the feed line 86, the charging line 88 and finally the intermediate line 22 to the high-pressure stage 21.2 of the compressor 21.

As can be seen, in the present case the feed line 86 is advantageously used for at least two purposes, namely firstly for constant loading of the pressure-holding pneumatic valve device 300a, and in particular the control line 36, or for selective loading of the pilot control port 240.1 of the vent valve 240, and secondly for selective charging of the compressor 21. In this way, an additional separate line for one of the two purposes, in particular for the pressure-holding valve device, is not absolutely necessary and the structural complexity, in particular the installation space required, is thereby reduced.

To terminate the vent process switched in this way, firstly the bellows valves (configured here as magnetic directional control valves 93) are closed and the power supply to the magnetic coil of the pilot valve 34 (configured as a 3/2-way valve) is eliminated so that this returns to the unpowered switched state shown in FIG. 1 under the effect of the control valve spring 35. The 3/2-way valve returns to its state shown in FIG. 1, and the third pilot valve port Y3 and the second pilot valve port Y2 of the pilot valve (configured as a 3/2-way valve) are pneumatically connected together. In this way, a pilot control channel 32, in particular the first part 36.1 of the control line 36 with the pilot control port 240.1, is vented to ambient pressure via a control vent line 37 connected to the vent line 70, and the vent valve spring 244 of the vent valve 240 closes the relay piston, so that the vent valve 240 returns to the non-pressurized state shown in FIG. 1, and isolates the second part 70.2 of the vent line 70 from the first part 70.1 and hence also from the main line 60, i.e. separates the third pneumatic port X3 from the fourth pneumatic port X4 in the vent line 70.

The valve device 300a shown in FIG. 1 furthermore has a selection valve 310. The selection valve 310 is arranged in the control line 36 so that, in the sense of a branch point, firstly, in a first operating position BS1, it connects the second part 36.2 of the control line 36 to a third part 36.3 of the control line 36, which—like the refinement shown in FIG. 1—connects the control line 36 to the feed line 86, but secondly however also, in a second operating position BS2, connects the second part 36.2 to a fourth part 36.4 of the control line 36, which pneumatically connects the second part 36.2 of the control line 36 to the pneumatic main line 60.

Details of the selection valve 310 are shown in detail D of FIG. 1. Here, the terms "selection valve" and "changeover valve" are not restricted to a single physical valve, and may also be understood as a "selection valve arrangement" and "changeover valve arrangement". A selection valve may for example be formed with two separate check valves, one of which has an additional spring.

The selection valve 310 with a first input A1 and a second input A2 is here configured as a pneumatic changeover valve 311, i.e. the respective input A1, A2 at which a relatively higher pressure P1, P2 prevails is opened and the respective other input A1, A2 is closed. In the present case, if the pressure P1 prevailing in a third part 36.3 of the control line 36 and hence at the first input A1 is higher than a second pressure P2 in the fourth part 36.4 and hence at the second input A2, because the pressure of the compressed air stored in the pressure accumulator 120 is higher than the pressure in the pneumatic main line 60, then in the first operating position (BS1) of the selection valve 310, accordingly the compressed air from the third part 36.3 can flow through the first input A1 into the second part 36.2 of the control line 36, wherein the flow through the fourth part 36.4 is interrupted at the second input A2 of the selection valve 310. Conversely and similarly, if the pressure in the pneumatic main line 60, which extends from the compressed air supply 1 to the compressed air port 2, is higher than the pressure in the pressure accumulator 120, in the second operating position (BS2) of the selection valve 310, air can flow from the fourth part 36.4 via the second input A2 into the second part 36.2 (and in the actuation position of the pilot valve 34, on to the pilot control port 240.1 of the vent valve 240), and the flow through the third part 36.3 of the control line 36 is blocked accordingly at the first input A1 of the selection valve 310.

The blocking of the input A1, A2 loaded with a lower pressure P1, P2 is achieved by the arrangement of the two valve bodies VK1, VK2 in the selection valve 310 (configured as a changeover valve 311), wherein each valve body in the sense of a check valve can open only in one flow direction and closes in the opposite direction. The air from the input A1, A2 loaded with a higher pressure P1, P2 thus presses back a valve body VK1, VK2 of the input A1, A2 loaded with the lower pressure, so that this is blocked. Because of the function of the changeover valve 311, by means of the selection valve 310, in general always the compressed air source with the higher pressure P1, P2 is used to load the pilot control port 240.1. If for example the pressure accumulator 120 is evacuated so far that the air pressure is no longer sufficient for pilot control of the vent valve 240, then if the air pressure in the pneumatic main line 60 is higher, the air for loading the pilot control port 240.1 of the vent valve 240 is automatically supplied to the pilot control port 240.1 from the pneumatic main line 60 which extends from the compressed air supply 1 to the compressed air port 2. The selection valve 310 is here in the first operating position BS1. To increase the air pressure in the pneumatic main line 60, in particular air can be conducted from the spring bellows 91 into the pneumatic main line 60 by corresponding opening of the directional control valves 93.

If equal pressures prevail in the selection valve 310 at the connection of the first input A1 and the second input A2, a preferred position VS may be predefined by a spring 310.1. In the present case, this preferred position VS lies at the first input A1 and connects the third part 36.3 of the control line 36 to the second part 36.2 of the control line 36, and the first operating position BS1 is thus selected for preference. Accordingly, a pressure P2 present at the second input A2 must overcome both the pressure P1 present at the first input A1 and also a spring force F of the spring 310.1 closing the second input A2.

The selection valve 310, shown in FIG. 1 on the second part 36.2 of the control line 36 serving as a pilot control channel 32, furthermore holds at a constant level a control pressure PS once fed into the second part 36.2 of the control line 36, so that the relay piston of the vent valve 240 remains actuated as a result of the control pressure PS maintained at the pilot control port 240.1, even independently of a pressure in the vent line 70 and the pneumatic main line 60, and the vent valve 240 in the vent line 70 remains open. In this way, the pneumatic installation 90 can be vented via the choke 62, the air dryer 61 and finally the vent line 70 to the vent port 3. Here, the nominal width of the choke 62 is designed to a size advantageous for regeneration of the air dryer 61.

Figure 2:
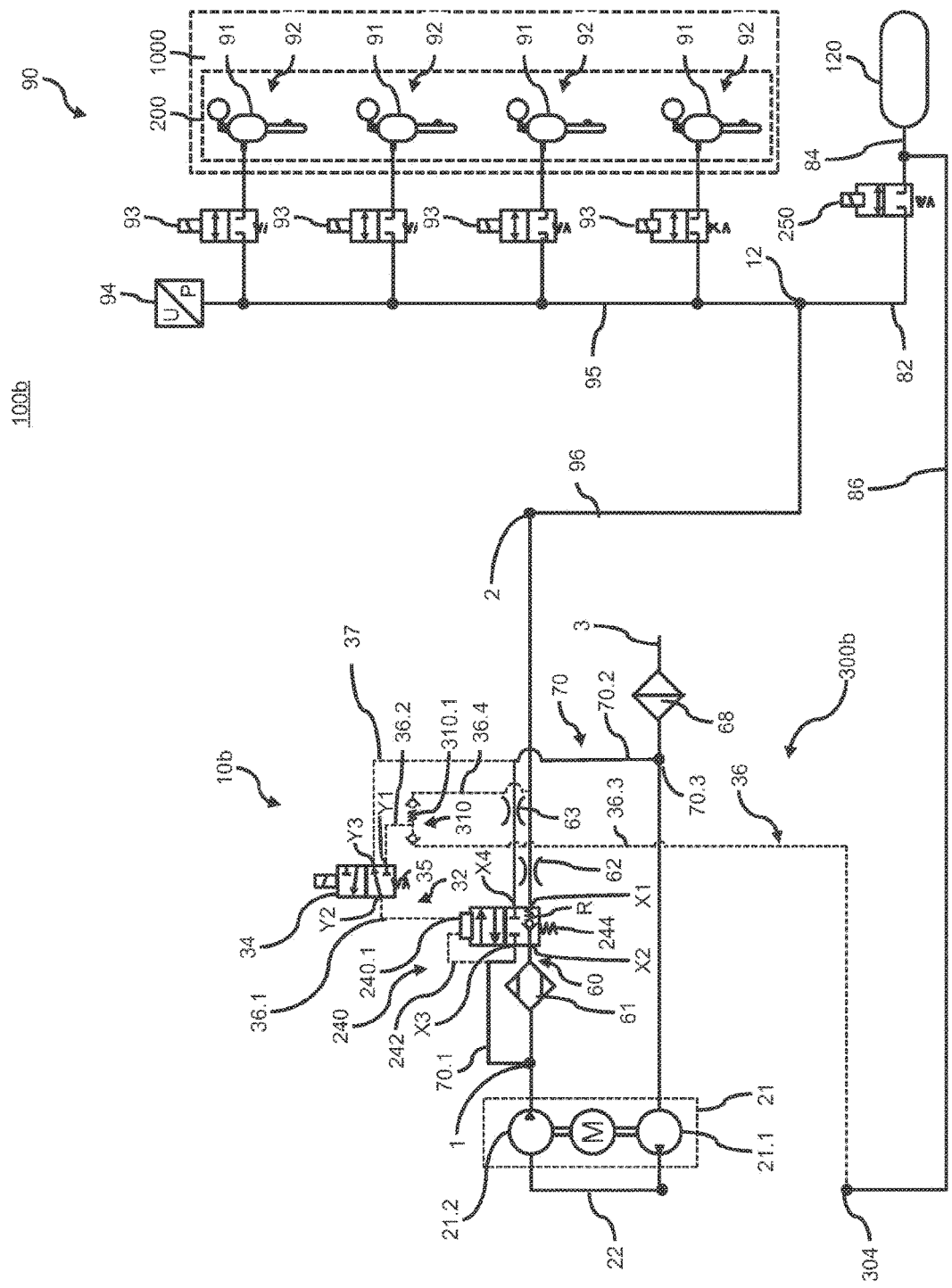
FIG. 2 shows a pneumatic system with a pressure-holding pneumatic valve device with a selection valve, wherein the feed line is used practically exclusively for loading the pilot control port of the vent valve.

FIG. 2 shows a further refinement of a pneumatic system 100b which substantially differs from the refinement shown in FIG. 1 in that there is no charging line 88 between the branch point 304 and the intermediate line 22. Thus in this refinement, there is no possibility of charging the compressor 21 with compressed air from the pressure accumulator 120. Accordingly, the feed line 86 serves exclusively to pressurize the control line 36, in particular the third part 36.3 of the control line 36. However, here too it may be advantageous, as already described for the two refinements presented above, to provide a pressure-holding valve device 300b, in particular using an already existing line, in particular a line originally provided or present in other embodiments for charging. This line may for example be part of a system of lines machined into a housing 21 (not shown here), wherein the housing 21 accommodates one or more parts of the pneumatic system 100b.

Figure 3:
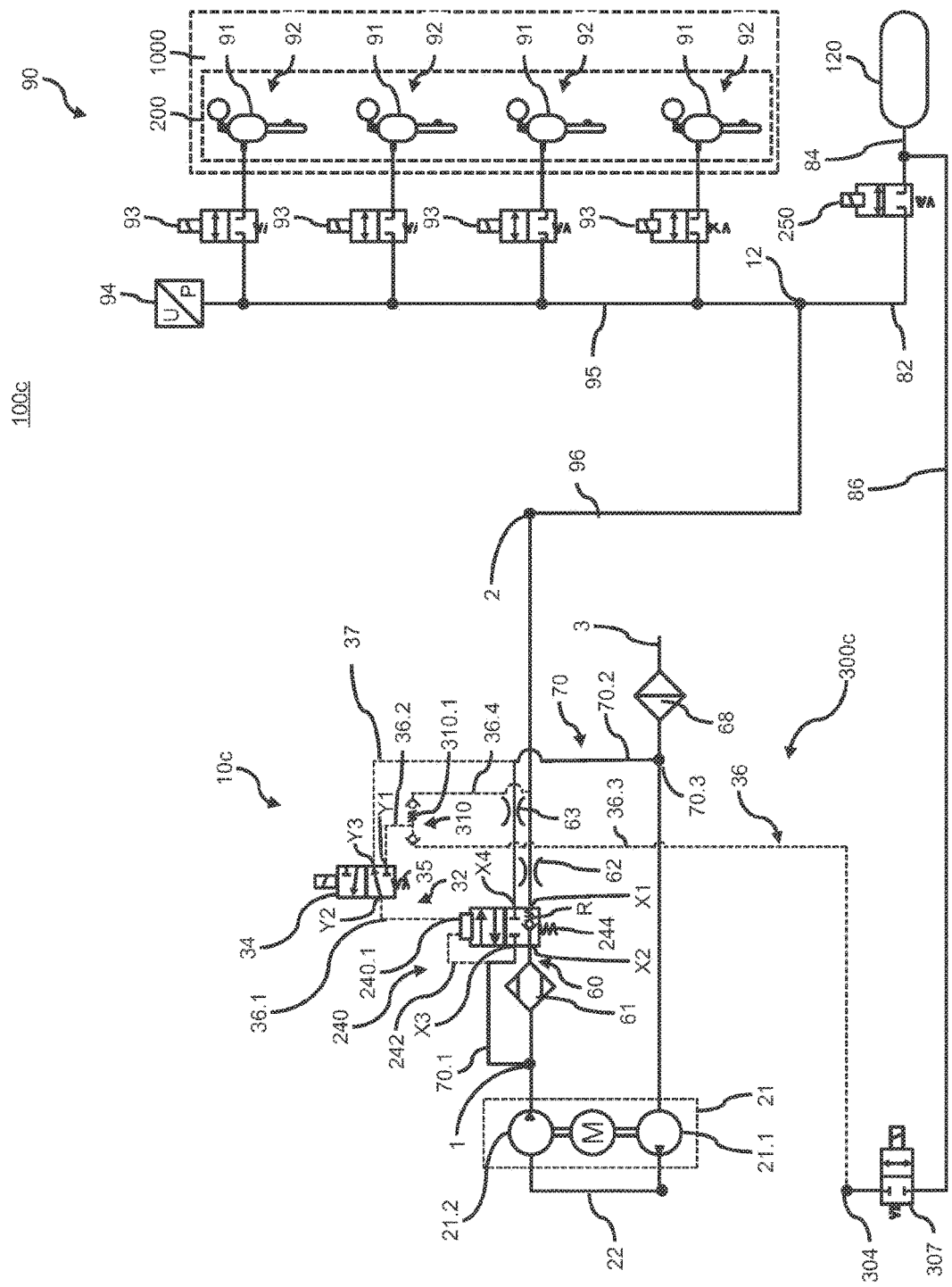
FIG. 3 shows a pneumatic system with a pressure-holding pneumatic valve device with a selection valve, wherein the loading of the pilot control port of the vent valve with compressed air can be switched selectively via a pilot switching valve.

FIG. 3 shows a further refinement of the invention which substantially differs from the refinement shown in FIG. 2 in that the loading of the control line 36, in particular third part 36.3, can be controlled by a pilot switching valve 307 arranged in the feed line 86. In this way, in particular it is advantageously possible to prevent the control line 36, in particular the third part 36.3, from being constantly under pressure. This controllability may in particular reduce or prevent a leakage of compressed air escaping from the pressure accumulator 120 via the control line 36.

Figure 4A:
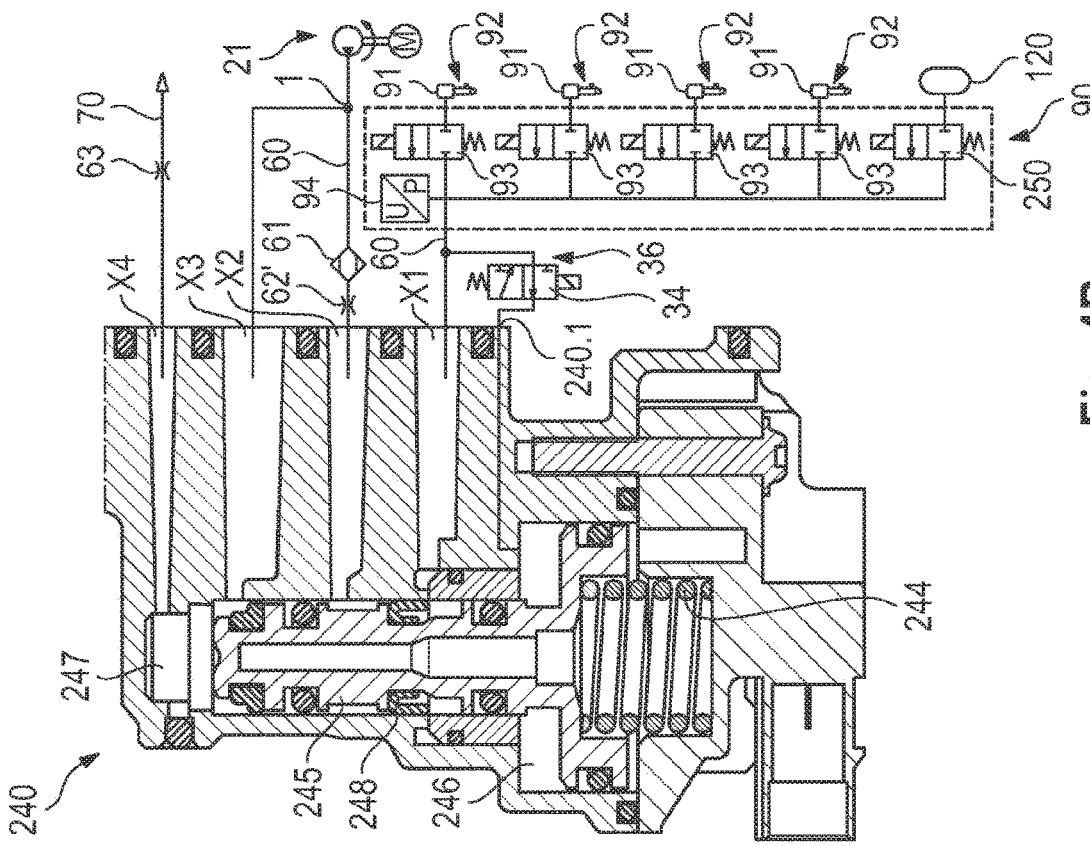
FIGS. 4A and 4B show sectional depictions of a vent valve in a delivery position and in a vent position, respectively.

FIG. 4A shows a vent valve 240 in the delivery position, i.e. when a compressor 21 compresses air, in particular for use in a pneumatic system 90. For this, the air compressed by the compressor 21 is conducted via a pneumatic main line 60 and an air dryer 61 to the second pneumatic port X2. From there, the air enters the vent valve cylinder 247, where it flows past a vent valve piston 245 and in particular past a sealing ring 248 to the first pneumatic port X1. The arrangement of vent valve piston 245, the vent valve cylinder 247 and sealing ring 248 is such that air can flow from the second pneumatic port X2 to the first pneumatic port X1, but not in the opposite direction from the first pneumatic port X1 to the second pneumatic port X2. Thus this arrangement fulfils the function of a check valve. From there, the air travels on to the pneumatic main line 60 and finally—depicted very simply—to the pneumatic installation 90. In the present case, a branch to the control line 36 is arranged on the portion of the pneumatic main line 60 shown here between the first pneumatic port X1 and the pneumatic installation 90. The control line 36 creates a pneumatic connection between the pneumatic main line 60 and the pilot control port 240.1 of the vent valve 240, wherein this pneumatic connection may be selectively closed and interrupted by a pilot valve 34 which is arranged in the control line 36 and configured as a magnetic valve. For reasons of simplicity, FIGS. 4A and 4B do not show the pressure-holding pneumatic valve device according to the concept of the invention.

Advantageously, the lines leading to the ports X1 to X4 may be choked, as in the present case by a first choke 62' arranged in the line to the second pneumatic port X2 of the vent valve 240, and a second choke 63 arranged in the line to the fourth pneumatic port X4.

Furthermore, in the delivery position, the position of the vent valve piston 245 inside the vent valve cylinder 247 is such that the flow from a third pneumatic port X3 to a fourth pneumatic port X4 is blocked. In this way, the pneumatic connection between the compressed air supply 1 and the vent line 70 is interrupted.

Figure 4B:
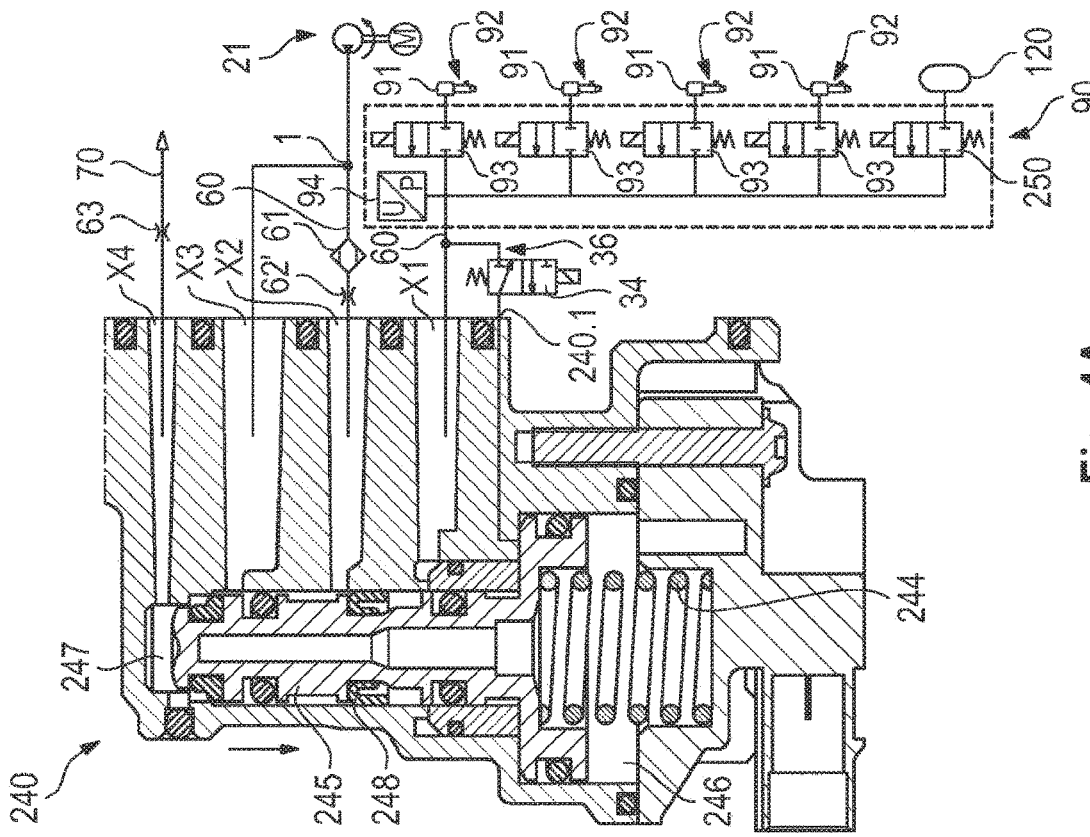

FIG. 4B shows the vent valve 240 in a regeneration or vent position. In the regeneration/vent position, the pilot valve 34 is opened such that air can enter the pilot control port 240.1 and pass from there into a control chamber 246. The compressed air flowing into the control chamber 246 leads to the vent valve piston 245 moving downward against the return force of a vent valve spring 244. In this position of the vent valve piston 245, air can flow both from the first pneumatic port X1 to the second pneumatic port X2, and in the opposite direction from the second pneumatic port X2 to the first pneumatic port X1. At the same time, air can flow both from the third pneumatic port X3 to the fourth pneumatic port X4, and also in the opposite direction from the fourth pneumatic port X4 to the third pneumatic port X3.

Figure 5:
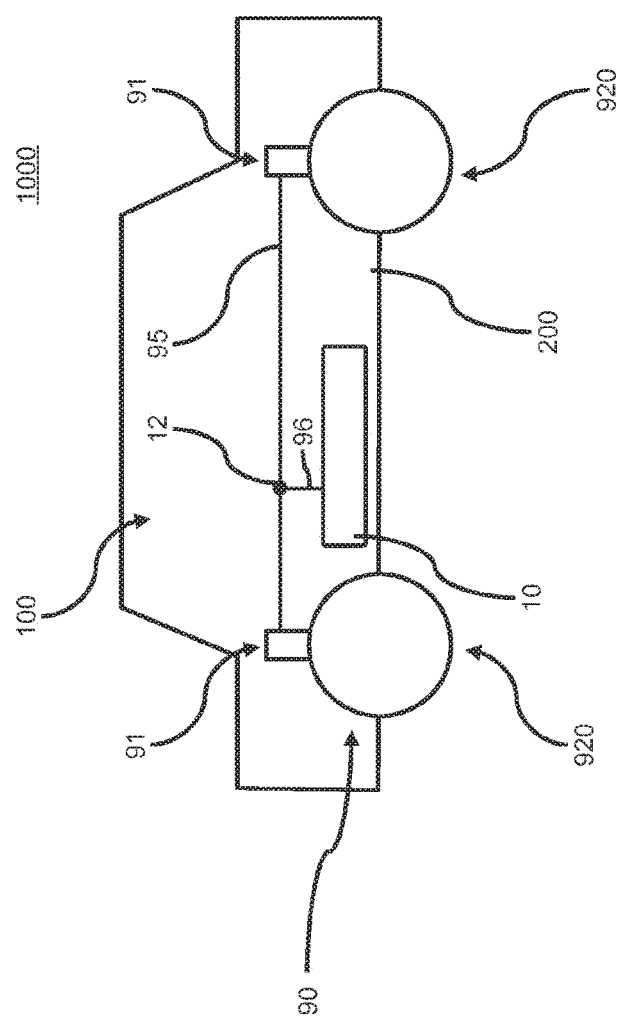
FIG. 5 shows a simplified illustration of a vehicle with a pneumatic system.

FIG. 5 shows a diagrammatic depiction of a vehicle 1000, this case in the form of a car, with a vehicle superstructure 200 having a pneumatic system 100 according to the concept of the invention, with a compressed air supply installation 10 and a pneumatic installation 90 configured as an air suspension system. In particular for vehicles in the car sector, the rapid provision of compressed air for ride height adjustment in operation is of great importance, since pauses, in particular for performance of an air pressure measurement, are perceptible to the driver of the vehicle. The car 1000 illustrated here as an example, without restriction of applicability also to trucks or other utility vehicles, has four wheels 920, of which—because of the sectional depiction—only the two wheels assigned to one vehicle side are shown. In the same way as the number of wheels, the air suspension system 90 has four air springs 92, of which—because of the sectional depiction (like the wheels)—only the two bellows assigned to one vehicle side are shown. The four air springs 92, which are assigned respectively to the four wheels 920, as part of the air suspension system 90, are supplied with compressed air by the compressed air supply installation 10. The compressed air supply installation 10 is connected via the supply line 96, the main gallery port 12 and the gallery 95, to the components of the pneumatic installation 90, in this case the four air springs 92.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE DESIGNATIONS

1 Compressed air supply
2 Compressed air port
3 Vent port
10, 10a-d Compressed air supply system
12 Main gallery port
21 Compressor arrangement, compressor
21.1 Low-pressure stage
21.2 High-pressure stage
22 Intermediate line
32 Pilot control channel
34 Pilot valve
35 Control valve spring
36 Control line
36.1 First part of control line
36.2 Second part of control line
36.3 Third part of control line
36.4 Fourth part of control line
37 Control vent line
60 Pneumatic main line
61 Air dryer
62, 62' First choke
63 Second choke
68 Air filter
70 Vent line
70.1 First part of vent line
70.2 Second part of vent line
70.3 Connection point
82 Pressure accumulator supply line
84 Accumulator line
86 Feed line
88 Charging line
90 Air suspension installation, pneumatic installation
91 Spring bellows, bellows
92 Air spring
93 Directional control valve
94 Pressure sensor
95 Gallery
96 Supply line 98 Magnetic valve block
100, 100a-d Pneumatic system
120 Pressure accumulator
200 Vehicle superstructure
240 Vent valve
240.1 Pilot control port of vent valve
242 Second pilot control port of vent valve
244 Vent valve spring
245 Vent valve piston
246 Control chamber
247 Vent valve cylinder
248 Sealing ring
250 Pressure storage valve
300a-300c Pressure-holding pneumatic valve device
304 Branch point
306 Charging valve
307 Pilot switching valve
310 Selection valve
310.1 Spring for predefining a preferred position
311 Changeover valve
400 Device for controlling and regulating the pneumatic system
920 Wheel
1000 Vehicle
A1, A2 First, second input of selection valve
BS1, BS2 First, second operating position
B1 Output of selection valve
F Spring force
M Motor
P1, P2 First pressure (at first input), second pressure (at second input)
PS Control pressure
R Check valve of vent valve
VK1, VK2 First, second valve body of selection valve
VS Preferred position
X1 First pneumatic port of vent valve
X2 Second pneumatic port of vent valve
X3 Third pneumatic port of vent valve
X4 Fourth pneumatic port of vent valve
XY Line connection
Y1 First pilot valve port
Y2 Second pilot valve port
Y3 Third pilot valve port

The invention claimed is:

1. A compressed air supply installation for operating a pneumatic installation in a pneumatic system of a vehicle, the compressed air supply installation comprising:
a compressed air supply;
a compressed air port to the pneumatic installation;
a vent port to a venting environment;
a pneumatic main line between the compressed air supply and the compressed air port, the pneumatic main line having an air dryer;
a vent valve arranged in the pneumatic main line, the vent valve being a first pilot valve having a pilot control port;
a compressor having at least one compressor stage;
a second pilot valve and a pneumatic pilot control channel which that pneumatically connects the second pilot valve to the pilot control port of the first pilot valve,
wherein a pressure-holding pneumatic valve device is connected to the pilot control port of the first pilot valve and is configured to provide, during venting of the pneumatic system and independently of a pressure in the main pneumatic line, a control pressure for the pilot control port of the first pilot valve,
and
wherein the pressure-holding pneumatic valve device is configured to be pneumatically connected to a pressure accumulator via a feed line, and
wherein the pressure-holding pneumatic valve device has a selection valve configured for autonomous connection of the pilot control port of the first pilot valve to the feed line in a first operating position and to the pneumatic main line in a second operating position, such that a line, selected from the feed line and the pneumatic main line, in which a relatively higher pressure prevails is connected to the pilot control port of the first pilot valve and a line, selected from the feed line and the pneumatic main line, in which a relatively lower pressure prevails is blocked from the pilot control port of the first pilot valve.

2. The compressed air supply installation as claimed in claim 1, wherein the feed line is configured to be pneumatically connected to the compressor for charging the compressor.

3. The compressed air supply installation as claimed in claim 1, wherein the selection valve is configured as a changeover valve.

4. The compressed air supply installation as claimed in claim 1, wherein the selection valve has an adjustable preferred position such that, with equal pressures at the first input and the second input of the selection valve, the input at the adjustable preferred position is connected to an output of the selection valve.

5. The compressed air supply installation as claimed in claim 4, wherein the selection valve has a spring configured to predefine the adjustable preferred position.

6. The compressed air supply installation as claimed in claim 1, wherein the compressor has a first low-pressure compressor stage and a second high-pressure compressor stage.

7. The compressed air supply installation as claimed in claim 1, wherein the feed line is configured to be pneumatically connected via a charging line to the compressor for charging the compressor.

8. The compressed air supply installation as claimed in claim 1, wherein the pressure-holding pneumatic valve device is fully or partly integrated in the compressed air supply installation.

9. A method for operating a compressed air supply installation, wherein the compressed air supply installation is configured to operate a pneumatic installation in a pneumatic system of a motor vehicle, and has a pressure-holding pneumatic valve device, the method comprising:
compressing air to provide compressed air;
supplying the pneumatic installation and/or a pressure accumulator and/or a gallery with the compressed air;
operating the pneumatic installation;
venting the pneumatic system via a vent valve configured as a pilot valve and having a pilot control port,
wherein the pressure-holding pneumatic valve device is connected to the pilot control port and holds the pilot control port under control pressure during venting of the pneumatic system and independently of a pressure in the pneumatic main line,
wherein the pressure-holding pneumatic valve device is configured to be pneumatically connected to a pressure accumulator via a feed line, and
wherein the pressure-holding pneumatic valve device has a selection valve for autonomous connection of the pilot control port to the feed line or the pneumatic main line, such that a line, selected from the feed line and the pneumatic main line, in which a relatively higher pressure prevails is connected to the pilot control port, and a line, selected from the feed line and the pneumatic main line, in which a relatively lower pressure prevails is blocked from the pilot control port.

10. A vehicle with a pneumatic system and a compressed air supply installation as claimed in claim 1.

* * * * *